(12) United States Patent  
Segovia et al.

(10) Patent No.: US 8,183,710 B2  
(45) Date of Patent: May 22, 2012

(54) PRE-STRESSED STIFFENING SYSTEM FOR A WIND TURBINE GENERATOR FRAME

(75) Inventors: Eugenio Yegro Segovia, Madrid (ES); Mateusz Pawel Wenclik, Ibbenbueren (DE); Prasad Ogde, Bangalore (IN); Rajasekhar Koppolu, Kadapa (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/974,506

(22) Filed: Dec. 21, 2010

(65) Prior Publication Data

US 2011/0204649 A1     Aug. 25, 2011

(51) Int. Cl.  
F03D 9/00 (2006.01)

(52) U.S. Cl. ............................... 290/55; 290/44

(58) Field of Classification Search .................... 290/43, 290/44, 54, 55  
See application file for complete search history.

(56) References Cited

U.S. PATENT DOCUMENTS

| | | | | |
|---|---|---|---|---|
| 4,449,053 A * | 5/1984 | Kutcher | ........................ | 290/44 |
| 4,491,739 A * | 1/1985 | Watson | ........................ | 290/44 |
| 5,375,324 A * | 12/1994 | Wallace et al. | ............ | 29/889.21 |
| 5,744,885 A | 4/1998 | Keck et al. | | |
| 6,088,904 A | 7/2000 | Keck et al. | | |
| 6,320,273 B1 * | 11/2001 | Nemec | ........................ | 290/55 |
| 6,518,680 B2 * | 2/2003 | McDavid, Jr. | ................. | 290/54 |
| 6,784,566 B2 * | 8/2004 | Thomas | ........................ | 290/55 |
| 2010/0139069 A1 | 6/2010 | Daniels et al. | | |

* cited by examiner

*Primary Examiner* — Nicholas Ponomarenko  
(74) *Attorney, Agent, or Firm* — James McGinness, Esq.; Armstrong Teasdale LLP

(57) ABSTRACT

A system for stiffening and pre-stressing a generator frame in a wind turbine is provided. The system includes a plurality of stress-inducing members configured for imparting a predetermined amount of stress on the generator frame. Each of the plurality of stress-inducing members has a length, a first end, and a second end and the length of each of said plurality of stress-inducing members is selectively adjustable. A coupling plate is configured for coupling the second ends of at least some of the plurality of stress-inducing members together. A plurality of brackets are coupled to the generator frame and configured to couple the first ends of the plurality of stress-inducing members to the generator frame.

20 Claims, 6 Drawing Sheets

PRE-STRESSED STIFFENING SYSTEM FOR A WIND TURBINE GENERATOR FRAME

BACKGROUND OF THE INVENTION

The subject matter described herein relates generally to wind turbines and, more particularly, to a pre-stressed stiffening system for a wind turbine generator frame.

Known wind turbines convert the kinetic energy of wind into electrical energy. Wind turbines include one or more blades that rotate when oncoming wind strikes the blades. The flow of wind over the wind turbine blades generates lift, induces rotation, and provides torque to generate power.

The torque generated by the rotation of the wind turbine blades is used to turn a shaft of a generator, that in turn generates electricity. The generator is supported by a frame disposed at or near the top of a tower. As the blades are struck by winds of variable speed and direction, forces of varying magnitudes are transmitted from the blades to the generator, and in turn the generator frame. Over time, these forces may lead to fatigue failure of the generator frame in the form of cracks or other similar defects. Since the generator frame is disposed at or near the top of the tower, the weight of the generator frame is a primary concern. As such, merely increasing the thickness of the generator frame (and correspondingly increasing the mass of the generator frame) is not an efficient solution to the fatigue failure of the generator frame. Accordingly, a solution is needed to prevent fatigue failure of generator frames that does not significantly increase the mass of the generator frames.

BRIEF DESCRIPTION OF THE INVENTION

In one aspect, a stiffening system for use in a generator frame of a wind turbine is provided. The system includes a plurality of stress-inducing members configured for imparting a predetermined amount of stress on the generator frame, each of the plurality of stress-inducing members having a first end and a second end, the first end configured to be coupled to the generator frame. A coupling plate is configured for coupling the second ends of two or more of the plurality of stress-inducing members together.

In another aspect, a stiffening system for use with a generator frame of a wind turbine is provided. The system includes a plurality of stress-inducing members configured for imparting a predetermined amount of stress on the generator frame, each of the plurality of stress-inducing members having a first end, a second end, and a length, each of the second ends of the plurality of stress-inducing members configured for coupling together. A plurality of brackets are coupled to the generator frame, each of the plurality of brackets configured to couple the first end of a corresponding stress-inducing member to the generator frame.

In another aspect, a generator frame for use in a wind turbine is provided. The frame includes a plurality of stress-inducing members configured for imparting a predetermined amount of stress on the generator frame, each of the plurality of stress-inducing members having a length, a first end, and a second end, the length of each of the plurality of stress-inducing members being selectively adjustable. The first ends of the stress-inducing members are coupled to the generator frame. A coupling member is configured for coupling the second ends of two or more of the plurality of stress-inducing members together.

DETAILED DESCRIPTION OF THE INVENTION

The embodiments described here provide stiffening systems for use in a generator frame of a wind turbine. Stress-inducing members impart a predetermined amount of stress on the generator frame. The stress-inducing members may themselves be pre-stressed as well. The stress-inducing members are relatively light weight structures that permit the generator frame to be a pre-stressed structure and reduce the effects of repeated loading of the generator frame. The reduction in the effects of repeated loading of the generator frame results in a reduced likelihood of failure of the generator frame due to fatigue. The stiffening systems may be used to retrofit existing wind turbines, or they may be included in the wind turbines during construction of the wind turbines.

Figure 1:
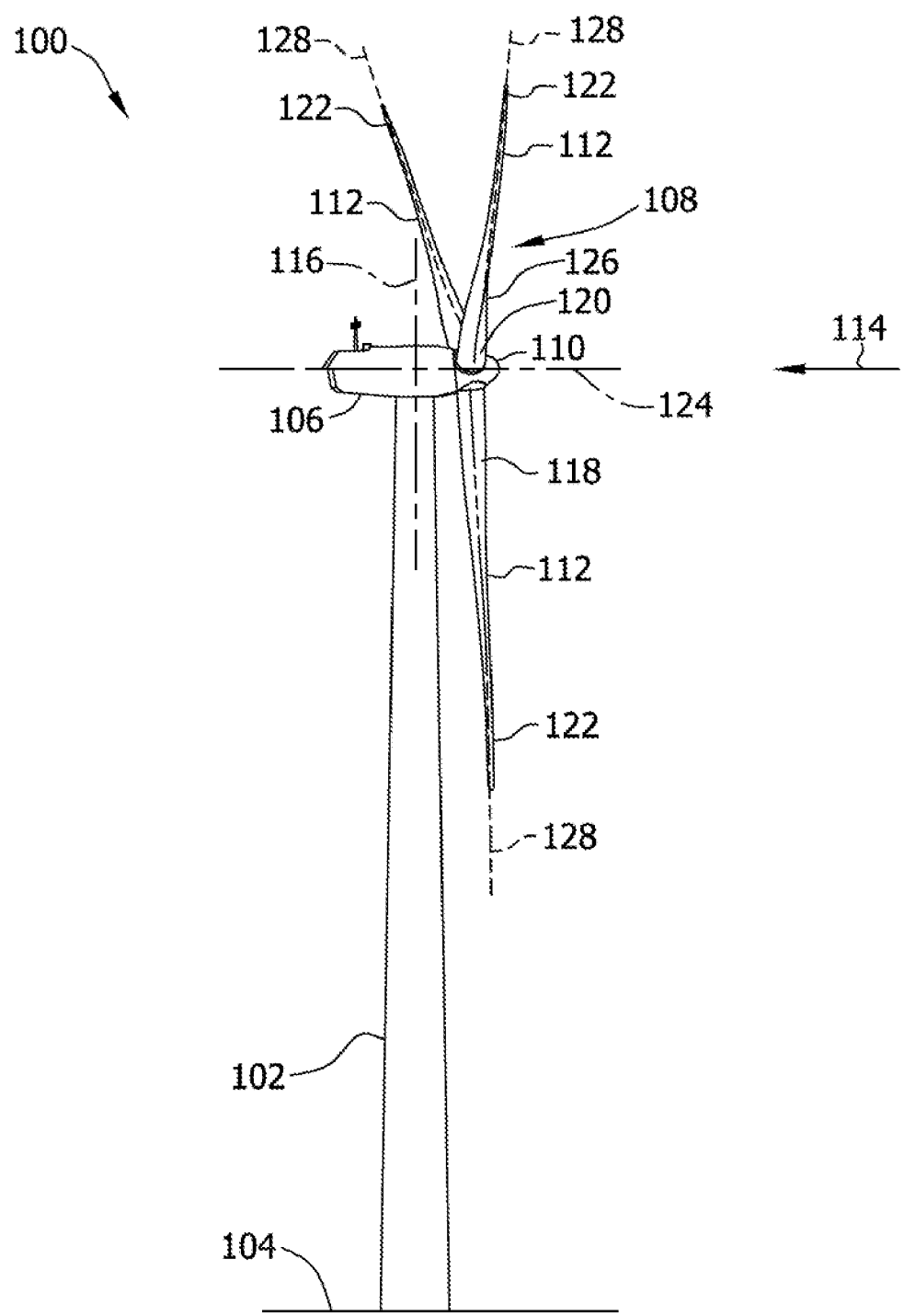
FIG. 1 is a side view of an exemplary wind turbine.

FIG. 1 is a schematic view of an exemplary wind turbine 100. In the exemplary embodiment, wind turbine 100 is a horizontal-axis wind turbine. Alternatively, wind turbine 100 may be a vertical-axis wind turbine. In the exemplary embodiment, wind turbine 100 includes a tower 102 extending from and coupled to a supporting surface 104. Tower 102 may be coupled to surface 104 with anchor bolts or via a foundation mounting piece (neither shown), for example. A nacelle 106 is coupled to tower 102, and a rotor 108 is coupled to nacelle 106. Rotor 108 includes a rotatable hub 110 and a plurality of rotor blades 112 coupled to hub 110. In the exemplary embodiment, rotor 108 includes three rotor blades 112. Alternatively, rotor 108 may have any suitable number of rotor blades 112 that enables wind turbine 100 to function as described herein. Tower 102 may have any suitable height and/or construction that enables wind turbine 100 to function as described herein.

Rotor blades 112 are spaced about hub 110 to facilitate rotating rotor 108, thereby transferring kinetic energy from wind 114 into usable mechanical energy, and subsequently, electrical energy. Rotor 108 and nacelle 106 are rotated about tower 102 on a yaw axis 116 to control a perspective of rotor blades 112 with respect to a direction of wind 114. Rotor blades 112 are mated to hub 110 by coupling a rotor blade root portion 118 to hub 110 at a plurality of load transfer regions 120. Load transfer regions 120 each have a hub load transfer region and a rotor blade load transfer region (both not shown in FIG. 1). Loads induced to rotor blades 112 are transferred to hub 110 via load transfer regions 120. Each rotor blade 112 also includes a rotor blade tip portion 122.

In the exemplary embodiment, rotor blades 112 have a length of between approximately 30 meters (m) (99 feet (ft)) and approximately 120 m (394 ft). Alternatively, rotor blades 112 may have any suitable length that enables wind turbine 100 to function as described herein. For example, rotor blades 112 may have a suitable length less than 30 m or greater than 120 m. As wind 114 contacts rotor blade 112, lift forces are induced to rotor blade 112 and rotation of rotor 108 about an axis of rotation 124 is induced as rotor blade tip portion 122 is accelerated.

A pitch angle (not shown) of rotor blades 112, i.e., an angle that determines the perspective of rotor blade 112 with respect to the direction of wind 114, may be changed by a pitch assembly (not shown in FIG. 1). More specifically, increasing a pitch angle of rotor blade 112 decreases an amount of rotor blade surface area 126 exposed to wind 114 and, conversely, decreasing a pitch angle of rotor blade 112 increases an amount of rotor blade surface area 126 exposed to wind 114. The pitch angles of rotor blades 112 are adjusted about a pitch axis 128 at each rotor blade 112. In the exemplary embodiment, the pitch angles of rotor blades 112 are controlled individually.

Figure 2:
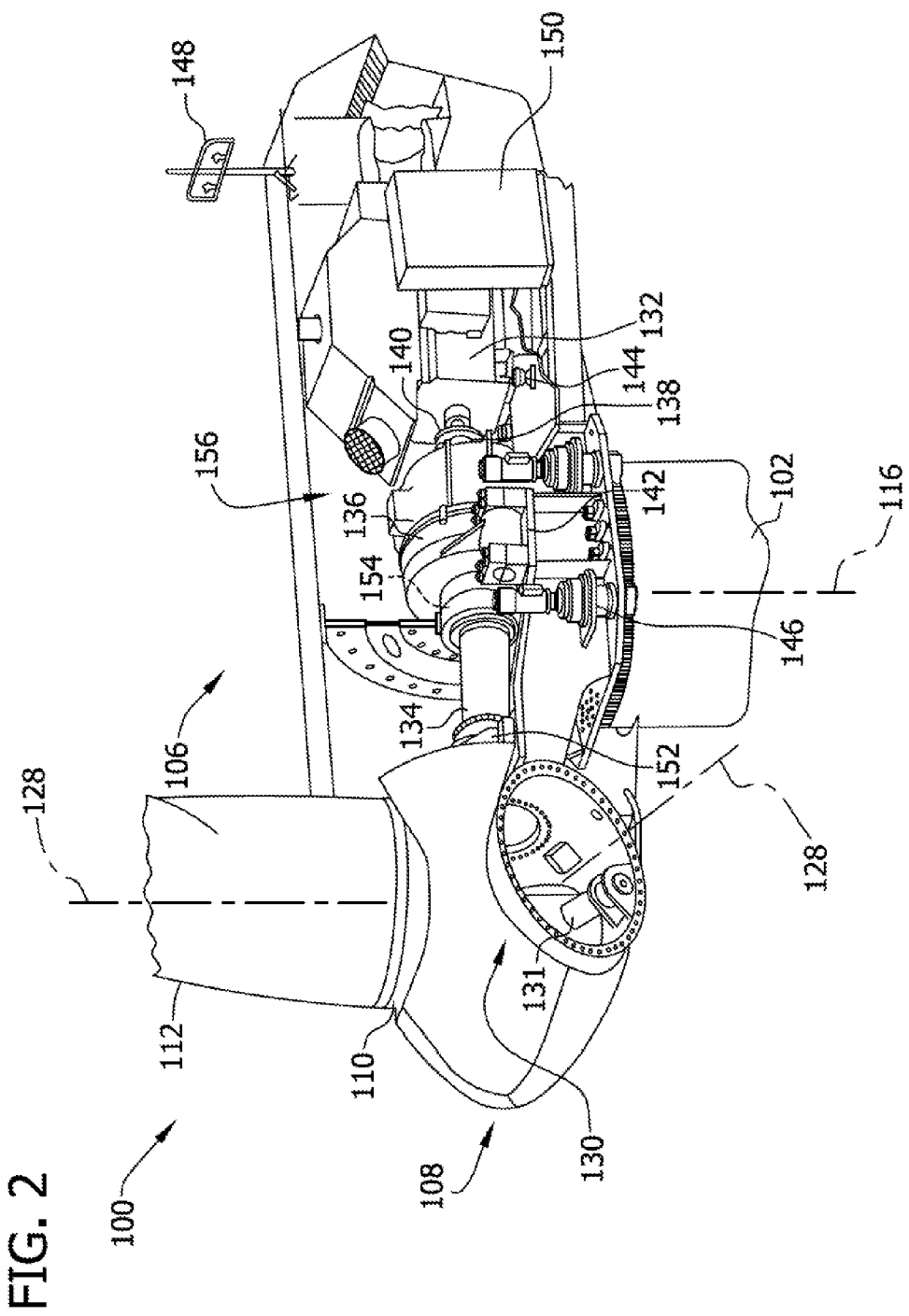
FIG. 2 is a partial sectional view of an exemplary nacelle suitable for use with the wind turbine shown in FIG. 1.

FIG. 2 is a partial sectional view of nacelle 106 of exemplary wind turbine 100 (shown in FIG. 1). Various components of wind turbine 100 are housed in nacelle 106. In the exemplary embodiment, nacelle 106 includes three pitch assemblies 130. Each pitch assembly 130 is coupled to an associated rotor blade 112 (shown in FIG. 1), and modulates a pitch of an associated rotor blade 112 about pitch axis 128. Only one of three pitch assemblies 130 is shown in FIG. 2. In the exemplary embodiment, each pitch assembly 130 includes at least one pitch drive motor 131.

As shown in FIG. 2, rotor 108 is rotatably coupled to an electric generator 132 positioned within nacelle 106 via a rotor shaft 134 (sometimes referred to as either a main shaft or a low speed shaft), a gearbox 136, a high speed shaft 138, and a coupling 140. Rotation of rotor shaft 134 rotatably drives gearbox 136 that subsequently drives high speed shaft 138. High speed shaft 138 rotatably drives generator 132 via coupling 140 and rotation of high speed shaft 138 facilitates production of electrical power by generator 132. Gearbox 136 is supported by a support 142 and generator 132 is supported by a generator frame 144 (only a portion of which is shown in FIG. 2). In the exemplary embodiment, gearbox 136 utilizes a dual path geometry to drive high speed shaft 138. Alternatively, rotor shaft 134 is coupled directly to generator 132 via coupling 140.

Nacelle 106 also includes a yaw drive mechanism 146 that rotates nacelle 106 and rotor 108 about yaw axis 116 to control the perspective of rotor blades 112 with respect to the direction of wind 114. Nacelle 106 also includes at least one meteorological mast 148 that includes a wind vane and anemometer (neither shown in FIG. 2). In one embodiment, meteorological mast 148 provides information, including wind direction and/or wind speed, to a turbine control system 150. Turbine control system 150 includes one or more controllers or other processors configured to execute control algorithms. As used herein, the term "processor" includes any programmable system including systems and microcontrollers, reduced instruction set circuits (RISC), application specific integrated circuits (ASIC), programmable logic circuits (PLC), and any other circuit capable of executing the functions described herein. The above examples are exemplary only, and thus are not intended to limit in any way the definition and/or meaning of the term processor. Moreover, turbine control system 150 may execute a SCADA (Supervisory, Control and Data Acquisition) program.

Pitch assembly 130 is operatively coupled to turbine control system 150. In the exemplary embodiment, nacelle 106 also includes forward support bearing 152 and aft support bearing 154. Forward support bearing 152 and aft support bearing 154 facilitate radial support and alignment of rotor shaft 134. Forward support bearing 152 is coupled to rotor shaft 134 near hub 110. Aft support bearing 154 is positioned on rotor shaft 134 near gearbox 136 and/or generator 132. Nacelle 106 may include any number of support bearings that enable wind turbine 100 to function as disclosed herein. Rotor shaft 134, generator 132, gearbox 136, high speed shaft 138, coupling 140, and any associated fastening, support, and/or securing device including, but not limited to, support 142, generator frame 144, forward support bearing 152, and aft support bearing 154, are sometimes referred to as a drive train 156.

Figure 3:
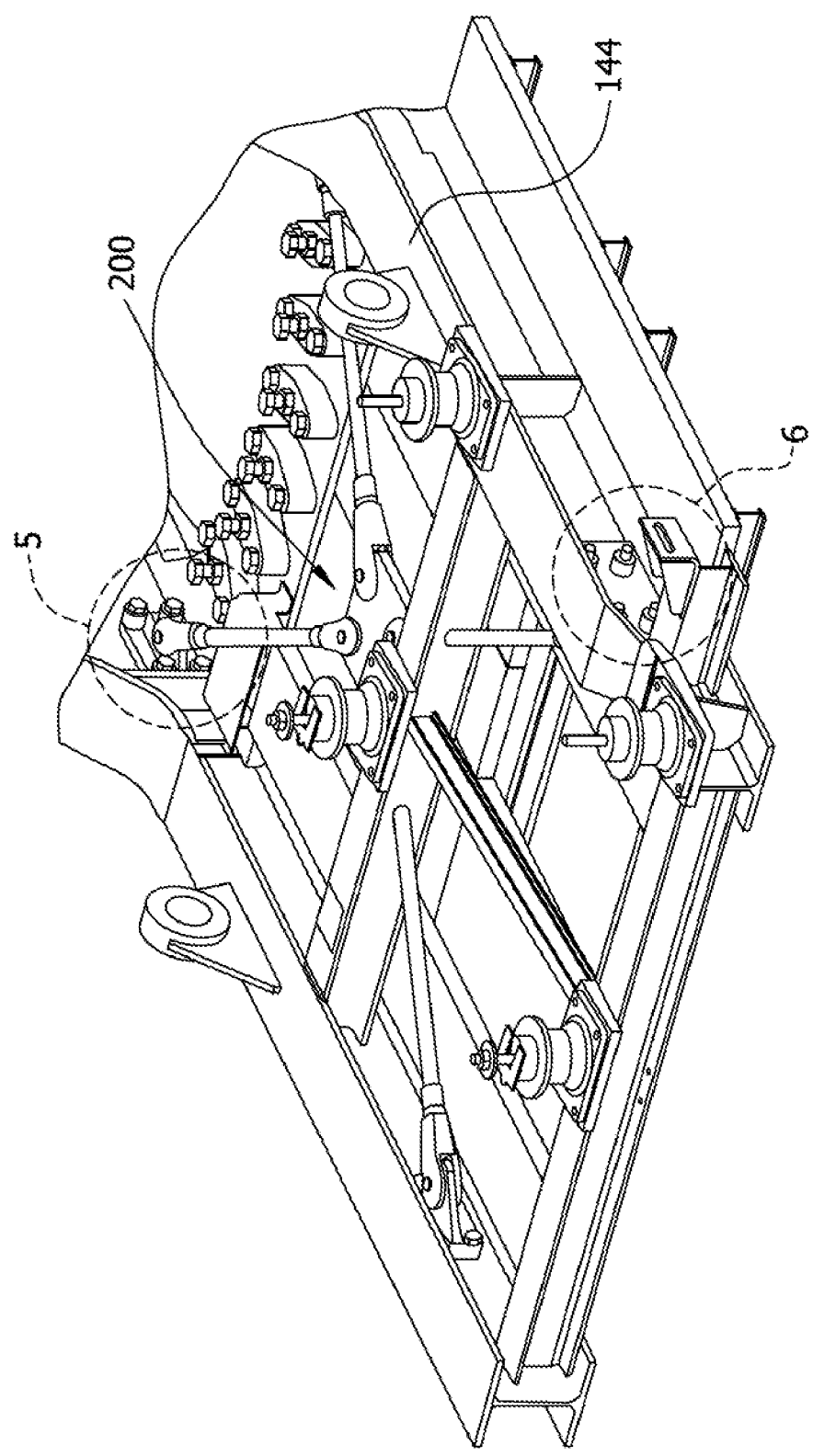
FIG. 3 is a perspective view of an exemplary stiffening system for use with the wind turbine shown in FIG. 1.
Figure 4:
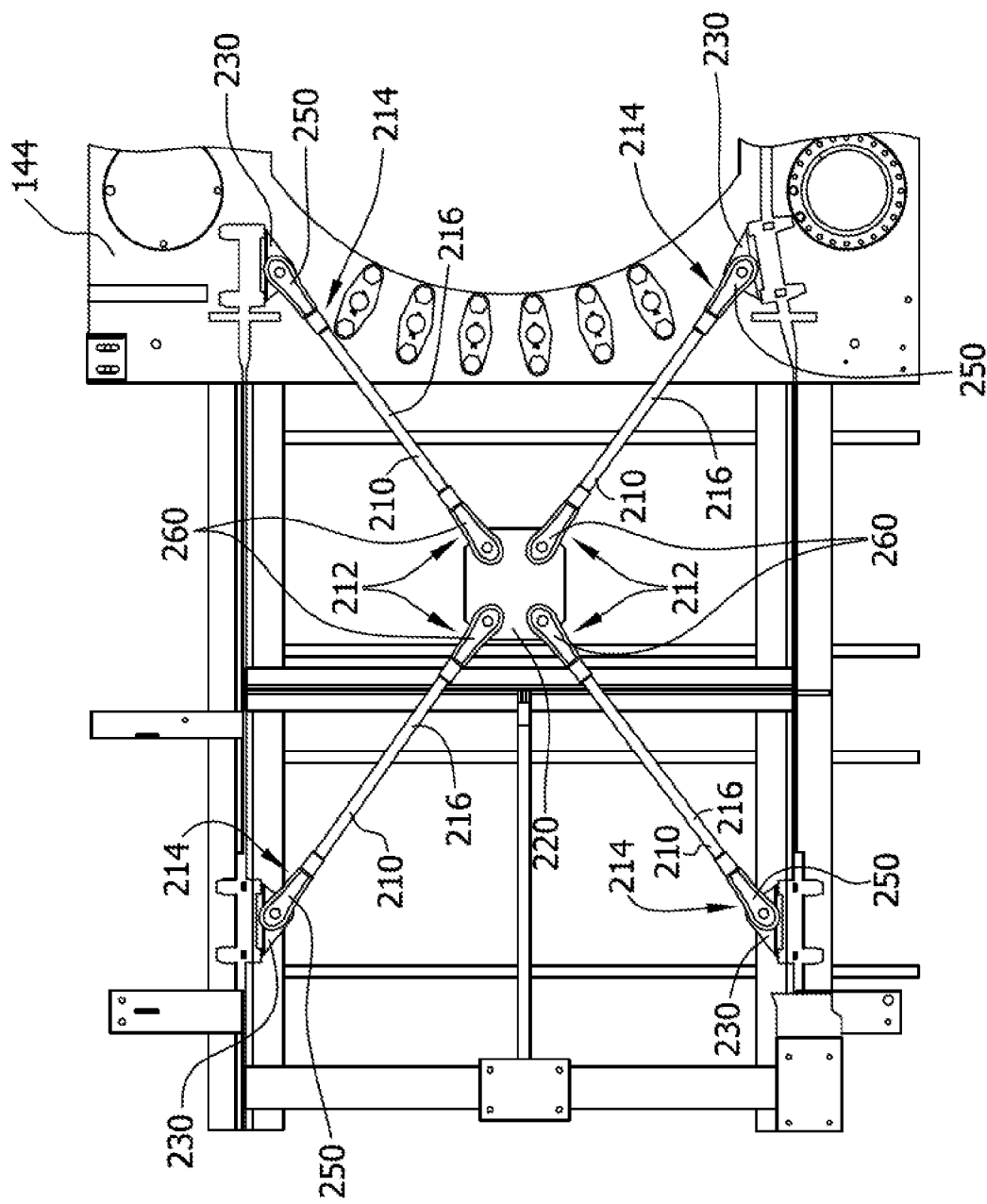
FIG. 4 is a top plan view of the exemplary stiffening system shown in FIG. 3.

FIG. 3 illustrates a perspective view of generator frame 144 partially shown in FIG. 2 and a stiffening system, referred to generally at 200. FIG. 4 is a top plan view of generator frame 144 and stiffening system 200. Stiffening system 200 is used to impart a predetermined amount of stress on generator frame 144 such that generator frame 144 is a pre-stressed structure. Stiffening system 200 includes a plurality of stress-inducing members 210, a coupling plate 220, and a plurality of brackets 230. While four stress-inducing members 210 are shown in the exemplary embodiment, any suitable number of stress-inducing members 210 may be used in other embodiments.

Figure 5:
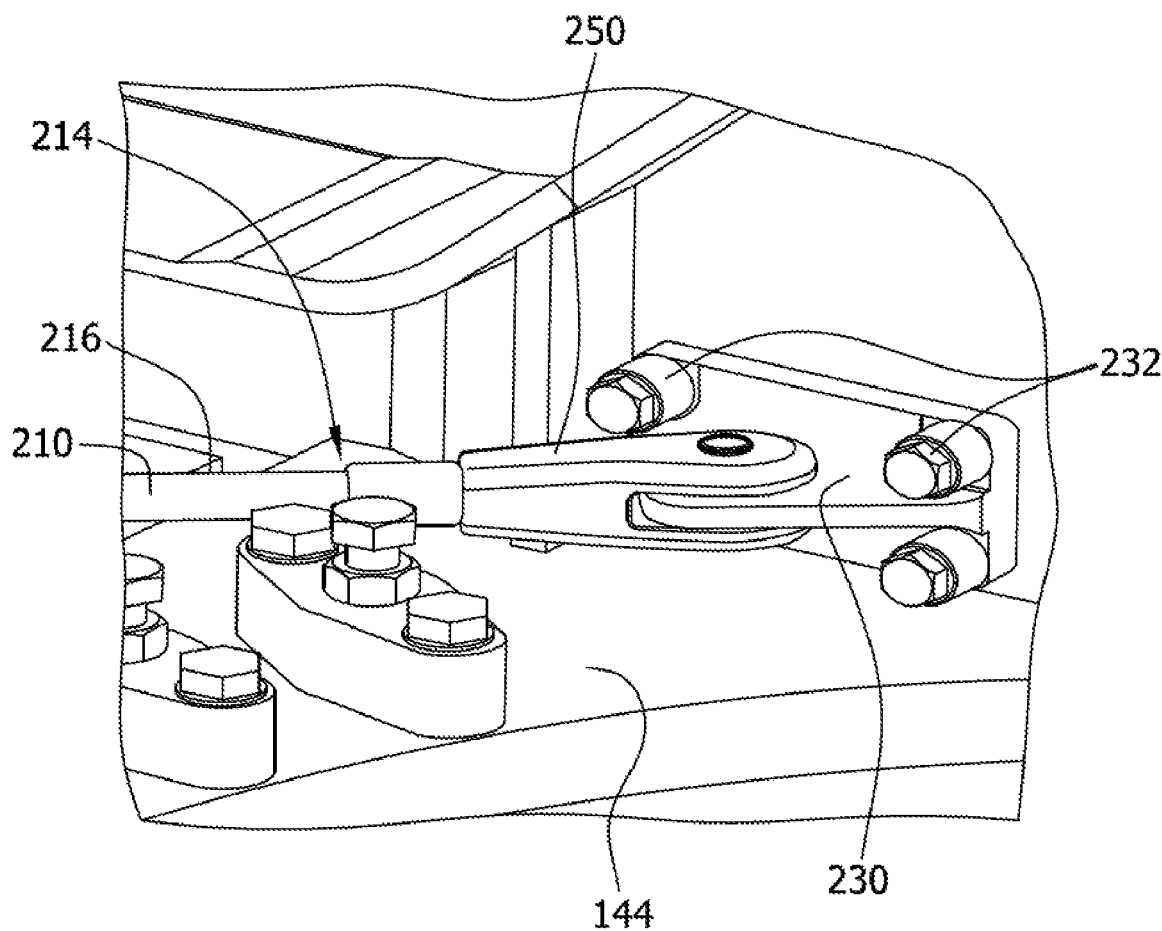
FIG. 5 is an enlarged view of a portion of the exemplary stiffening system shown in FIG. 3.

Referring to FIG. 4, each stress-inducing member 210 has a first end 214 and a second end 212 disposed on opposite ends of a main body 216. First end 214 of stress-inducing member 210 is configured to be coupled to generator frame 144. In the exemplary embodiment, one of brackets 230 (FIG. 5) is used to couple first end 214 of stress-inducing member 210 to generator frame 144. Brackets 230 have a central opening for receiving a mechanical fastener. The mechanical fastener is used to couple first ends 214 of stress-inducing members 210 to generator frame 144. Brackets 230 also have additional openings sized for receiving additional mechanical fasteners 232 to couple brackets 230 to generator frame 144. In some embodiments, multiple openings are formed in generator frame 144 such that brackets 230 can be positioned at different locations on generator frame 144.

In other embodiments, mechanical fasteners 232 are not used to couple brackets 230 to generator frame 144 and instead welding or any other suitable coupling mechanism may be used to couple brackets 230 to generator frame 144. Moreover, rather than using brackets 230 to couple first ends 214 of stress-inducing members 210 to generator frame 144, first ends 214 may instead be coupled to generator frame 144 by any suitable fastening mechanism.

Figure 6:
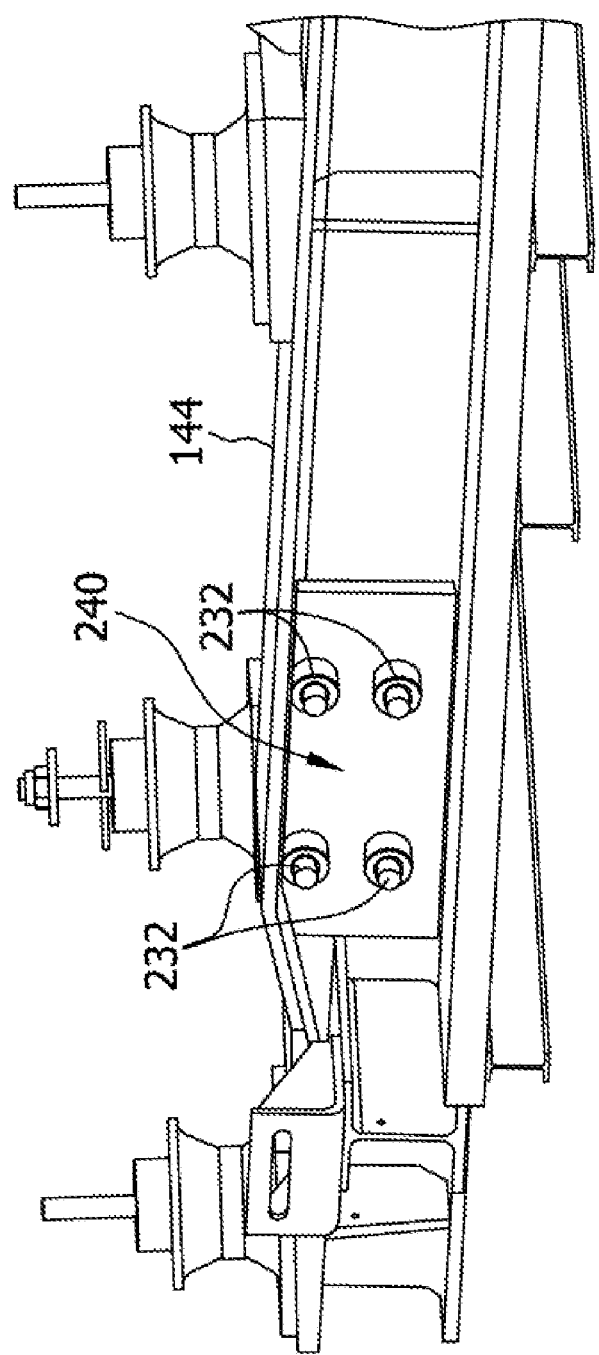
FIG. 6 is an enlarged view of a portion of the exemplary stiffening system shown in FIG. 3.

A stiffener plate 240, as best seen in FIG. 6, is positioned adjacent generator frame 144 opposite each of brackets 230 in the exemplary embodiment. In other embodiments, stiffener plates 240 may be positioned differently, such as between generator frame 144 and brackets 230. Stiffener plates 240 may be coupled to generator frame 144 with any suitable fasteners or other coupling mechanism. In the exemplary embodiment, stiffener plates 240 are coupled to generator frame 144 by mechanical fasteners 232. Stiffener plates 240 increase the strength of generator frame 144 at the location where stiffener plates 240 are positioned in order to ensure that forces applied by brackets 230 to generator frame 144 do not cause a failure of generator frame 144 at portions of generator frame 144 adjacent brackets 230. In other embodiments, stiffener plates 240 are not used and in such embodiments the thickness of generator frame 144 may be increased relative to the remainder of generator frame 144 at locations on generator frame 144 where brackets 230 are coupled thereto.

In the exemplary embodiment, the second ends 212 of stress-inducing members 210 are coupled together by a coupling plate 220. Coupling plate 220 is a substantially rigid structure with a plurality of openings formed therethrough. Openings are sized for receiving a portion of a suitable mechanical fastener for coupling second ends 212 of stress-inducing members 210 to coupling plate 220. In other embodiments, second ends 212 of each of stress-inducing members 210 are coupled together by a mechanical fastener or any other suitable device, rather than using coupling plate 220. Coupling plate 220 may also by any member that couples seconds 212 of stress-inducing members 210 together (e.g., a pin).

A first turnbuckle 250 is coupled to first end 214 of one or more stress-inducing members 210 and a second turnbuckle 260 is coupled to second end 212 of one or more stress-inducing members 210 in the exemplary embodiment. Turnbuckles 250, 260 are broadly referred to as "length adjusting mechanisms." Turnbuckles 250, 260 permit a length of stress-inducing member 210 to be adjusted (i.e., increased or decreased). In the exemplary embodiment, first ends 214 of stress-inducing members 210 are coupled to brackets 230 by first turnbuckles 250 and second ends 212 of stress-inducing members 210 are coupled to coupling plate 220 by second turnbuckles 260. In operation, turnbuckles 250, 260 are rotatable in a first direction to increase the length (and thus the length of stress-inducing members 210) and rotatable in a second, opposite direction to decrease the length of turnbuckles 250, 260 (and thus the length of stress-inducing members 210). In other embodiments, different types of length adjusting mechanisms may be used to change or adjust the lengths of stress-inducing members 210, such as jack screws, linear actuators, or any other suitable device. Moreover, in yet other embodiments, length adjusting mechanisms may only be used on one of the ends of each stress-inducing member 210 and/or some stress-inducing members 210 in stiffening system 100 may not use length adjusting mechanisms.

In the exemplary embodiment, stress-inducing members 210 are rigid structures, such as rods made from steel, alloys thereof, or other suitable rigid materials. Stress-inducing members 210 are thus able to resist forces in tension (i.e., forces applied in a direction substantially parallel to the length and/or longitudinal axis thereof that act to attempt to lengthen stress-inducing members) and forces in compression (i.e., forces applied in a direction substantially parallel to the length and/or longitudinal axis thereof that act to attempt to shorten stress-inducing members). However, in other embodiments stress-inducing members 210 may be flexible structures such as, but not limited to, rope (wire or otherwise), cable, chains, or other suitable flexible materials. Stress-inducing members 210 in these embodiments are thus able resist force in tension, but may not be able to resist substantial forces applied thereto in compression.

In operation, the stiffening system 100 is used to pre-stress and/or stiffen generator frame 144. To retrofit an existing generator frame 144 or install stiffening system 100 in a new generator frame 144, brackets 230 and/or stiffening plates 240 are coupled to generator frame 144 with mechanical fasteners or any other suitable fastening system (e.g., welding). As described above, first turnbuckles 250 may then be used to couple first ends 214 of stress-inducing members 210 to brackets 230. In other embodiments, first turnbuckles 250 are not used and instead first ends 214 of stress-inducing members 210 are coupled directly to brackets 230 by suitable fasteners. Second turnbuckles 260 are then used to couple second ends 212 of stress-inducing members 210 to coupling plate 230, thus coupling second ends 212 of stress-inducing members 210 together. In other embodiments, coupling plate 230 may not be used and as such second turnbuckles 260 and/or second ends 212 of stress-inducing members 210 are coupled together. The order of steps in the assembly and/or retrofitting of stiffening system 200 described herein is exemplary in nature, and the steps may thus be performed in any suitable order.

Once assembled, stiffening system 200 is used to pre-stress generator frame 144. To accomplish this, the lengths of stress-inducing members 210 are shortened such that stress-inducing members 210 are placed in tension. By placing stress-inducing members 210 in tension, force is exerted by stress-inducing members 210 on brackets 230, and in turn generator frame 144, thus resulting in generator frame 144 being a pre-stressed structure. Accordingly, one or more of turnbuckles 250, 260 (or other length adjusting mechanisms) is operated to shorten the length of the respective stress-inducing members 210. Turnbuckles 250, 260 may be rotated by a suitable tool to shorten their length, and thus the length of stress-inducing members 210.

The length of the stress-inducing members 210 may be shortened to a predetermined length to impart a desired force on generator frame 144. In one embodiment, load cells (not shown) or other suitable measurement devices may be used to measure the amount of force imparted by stress-inducing members 210 on generator frame 144. Other embodiments may calculate the amount of force imparted by stress-inducing members 210 on generator frame 144 by measuring the length of stress-inducing members 210 after they are placed in tension and comparing it to their length before being placed in tension to determine the strain and/or elongation of stress-inducing members 210. Various analytical and/or empirical methods may then be used to determine the force imparted by stress-inducing members 210 on generator frame 144 based on the material properties (e.g., Young's modulus, tensile strength, cross-sectional area, etc.) of stress-inducing members 210.

The examples used herein are illustrative only, and are not meant to be limited to the elements of those examples. The above-described embodiments provide an efficient and cost-effective system for stiffening and pre-stressing a generator frame in a wind turbine, without significantly increasing the mass of the generator frame. The stiffening system thus increases the strength of the generator frame and significantly reduces the likelihood the generator frame will succumb to fatigue failure.

Exemplary embodiments of a wind turbine, a generator frame, and a stiffening system for pre-stressing the generator frame are described above in detail. The stiffening system and wind turbine are not limited to the specific embodiments described herein, but rather, components of the turbine and/or stiffening system and/or steps of the method may be utilized independently and separately from other components and/or steps described herein. For example, the stiffening system may also be used in combination with other systems and methods, and is not limited to practice with only the wind turbine and method as described herein. Rather, the exemplary embodiment can be implemented and utilized in connection with many other wind turbine applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A stiffening system for use in a generator frame of a wind turbine, said stiffening system comprising:
    a plurality of stress-inducing members configured for imparting a predetermined amount of stress on the generator frame, each of said plurality of stress-inducing members having a first end and a second end, said first end configured to be coupled to the generator frame; and,
    a coupling plate configured for coupling said second ends of two or more of said plurality of stress-inducing members together.

2. A system in accordance with claim 1, wherein a length of each of said plurality of stress-inducing members is adjustable.

3. A system in accordance with claim 2, further comprising a first length adjusting mechanism coupled to a respective said first end of one of said plurality of stress-inducing members.

4. A system in accordance with claim 3, wherein said first length adjusting mechanism comprises a turnbuckle.

5. A system in accordance with claim 2, further comprising a second length adjusting mechanism coupled to a respective said second end of one of said plurality of stress-inducing members.

6. A system in accordance with claim 5, wherein said second length adjusting mechanism comprises a turnbuckle.

7. A system in accordance with claim 1, wherein said plurality of stress-inducing members comprises rigid structures.

8. A system in accordance with claim 1, wherein said plurality of stress-inducing members comprises flexible structures.

9. A stiffening system for use with a generator frame of a wind turbine, said stiffening system comprising:
    a plurality of stress-inducing members configured for imparting a predetermined amount of stress on the generator frame, each of said plurality of stress-inducing members having a first end, a second end, and a length, each of said second ends of said plurality of stress-inducing members configured for coupling together; and,
    a plurality of brackets coupled to the generator frame, each of said plurality of brackets configured to couple said first end of a corresponding stress-inducing member to the generator frame.

10. A system in accordance with claim 9, wherein at least one of said plurality of brackets is configured to be coupled to the generator frame at a plurality of different locations on the generator frame.

11. A system in accordance with claim 9, wherein said plurality of stress-inducing members comprises rigid structures.

12. A system in accordance with claim 9, further comprising a stiffener plate coupled to at least one of the generator frame and one of said plurality of brackets.

13. A system in accordance with claim 9, further comprising a first turnbuckle coupled to said first end of one of said plurality of stress-inducing members.

14. A system in accordance with claim 9, further comprising a second turnbuckle coupled to said second end of one of said plurality of stress-inducing members.

15. A system in accordance with claim 13, wherein said first turnbuckle is configured to change the length of said one of said plurality of stress-inducing member to which it is coupled.

16. A system in accordance with claim 14, wherein said second turnbuckle is configured to change the length of said one of said plurality of stress-inducing member to which it is coupled.

17. A system in accordance with claim 9, further comprising a coupling plate configured for coupling said second ends of at least two of said plurality of stress-inducing members together.

18. A generator frame for use in a wind turbine, said frame comprising:
    a plurality of stress-inducing members configured for imparting a predetermined amount of stress on said generator frame, each of said plurality of stress-inducing members having a length, a first end, and a second end, the length of each of said plurality of stress-inducing members being selectively adjustable, each of said first ends coupled to said generator frame; and
    a coupling member configured for coupling said second ends of two or more of said plurality of stress-inducing members together.

19. A frame in accordance with claim 18, further comprising a plurality of first turnbuckles, each of said plurality of first turnbuckles coupled to a respective one of said first ends of said plurality of stress-inducing members.

20. A frame in accordance with claim 18, further comprising a plurality of second turnbuckles, each of said plurality of second turnbuckles coupled to a respective one of said second ends of said plurality of stress-inducing members.

* * * * *